(12) United States Patent
Bassahon et al.

(10) Patent No.: US 6,926,404 B2
(45) Date of Patent: Aug. 9, 2005

(54) SPECTACLES WITH INTERCHANGEABLE LENSES

(75) Inventors: Pierre Bassahon, Albigny sur Saone (FR); Marc Delery, Caluire (FR)

(73) Assignee: Owoay (FR)

( * ) Notice: Subject to any disclaimer, the term of this patent is extended or adjusted under 35 U.S.C. 154(b) by 66 days.

(21) Appl. No.: 10/415,154

(22) PCT Filed: Oct. 15, 2001

(86) PCT No.: PCT/FR01/03191

§ 371 (c)(1),
(2), (4) Date: Mar. 1, 2004

(87) PCT Pub. No.: WO02/35279

PCT Pub. Date: May 2, 2002

(65) Prior Publication Data

US 2004/0130673 A1 Jul. 8, 2004

(30) Foreign Application Priority Data

Oct. 25, 2000 (FR) .............................. 00 13691
Jul. 24, 2001 (FR) .............................. 01 09873

(51) Int. Cl.[7] ................................................ G02C 1/04
(52) U.S. Cl. ...................... 351/103; 351/105; 351/108; 351/153; 16/228
(58) Field of Search .................................. 351/103–109, 351/140, 153; 16/228

(56) References Cited

U.S. PATENT DOCUMENTS

| 3,701,591 A | | 10/1972 | Wichers ....................... 351/41 |
| 5,587,747 A | * | 12/1996 | Bernheiser .................. 351/105 |
| 5,661,536 A | * | 8/1997 | Conway ...................... 351/121 |
| 5,898,469 A | * | 4/1999 | Wang .......................... 351/86 |
| 6,086,199 A | | 7/2000 | Holland et al. ............... 351/86 |

FOREIGN PATENT DOCUMENTS

| FR | 2 686 983 | 8/1993 |
| WO | WO 95 13558 | 5/1995 |
| WO | WO 96 25982 | 9/1995 |

* cited by examiner

*Primary Examiner*—Huy Mai
(74) *Attorney, Agent, or Firm*—Cantor Colburn LLP

(57) ABSTRACT

The invention concerns eyewear with means for interchanging a lens including non-rectilinear assembly zones provided on lateral edges of the lens, zones for receiving the assembly zones, one of which is formed at least partly by a piece mobile relative to the frame, and retaining means for normally maintaining the mobile piece in an engagement position.

14 Claims, 6 Drawing Sheets

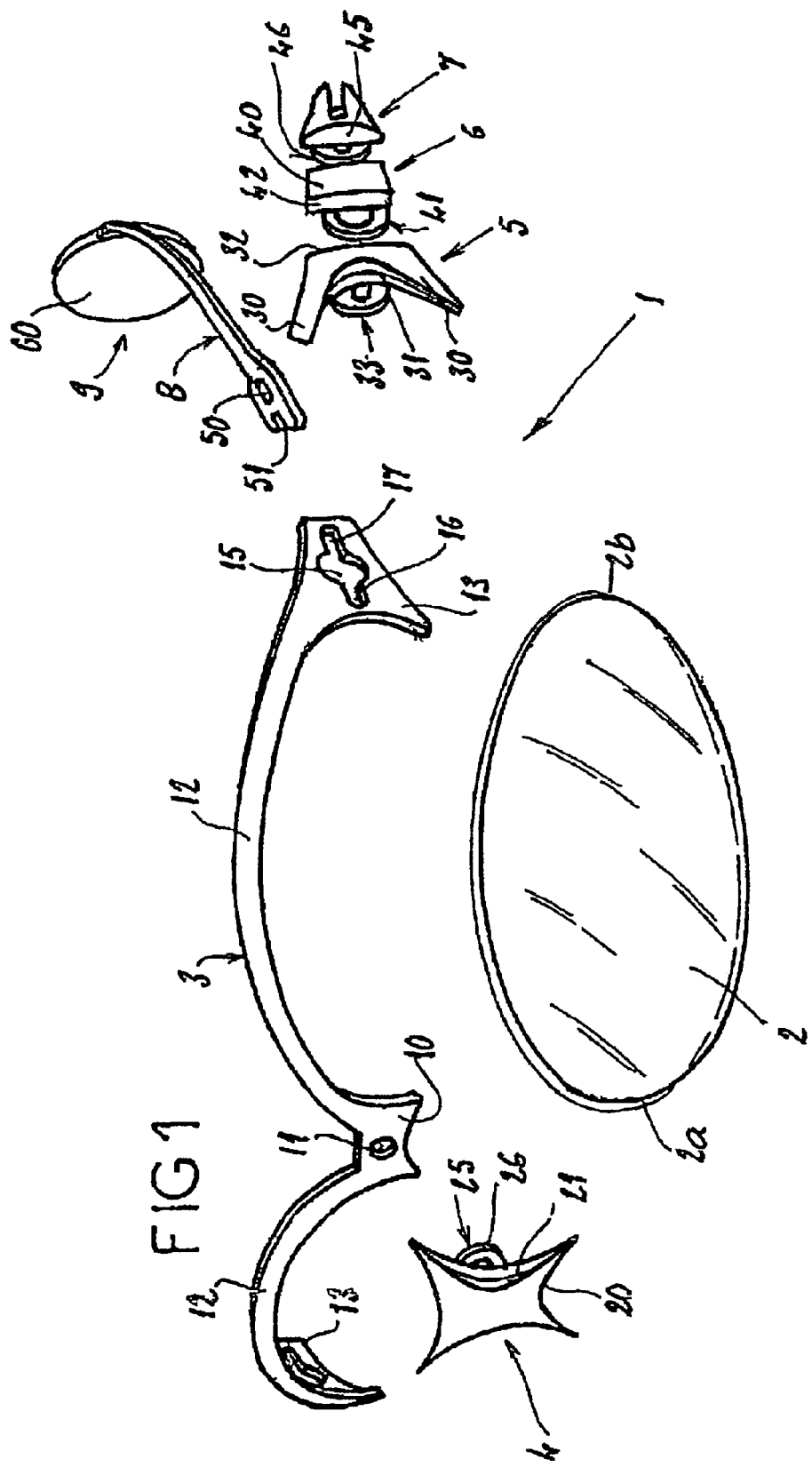

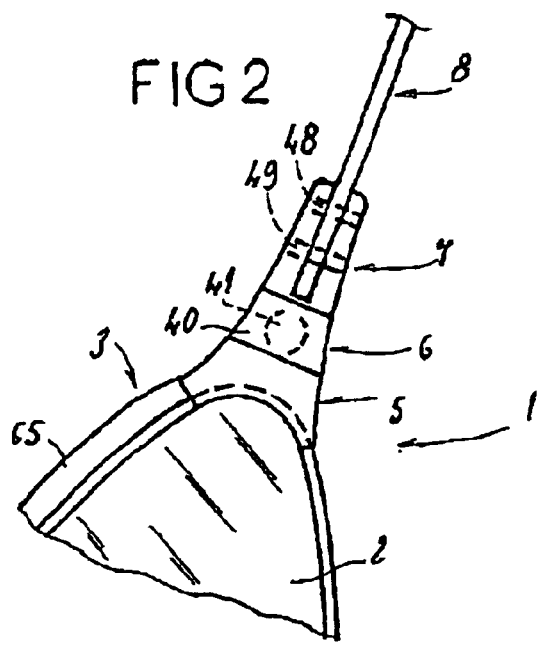
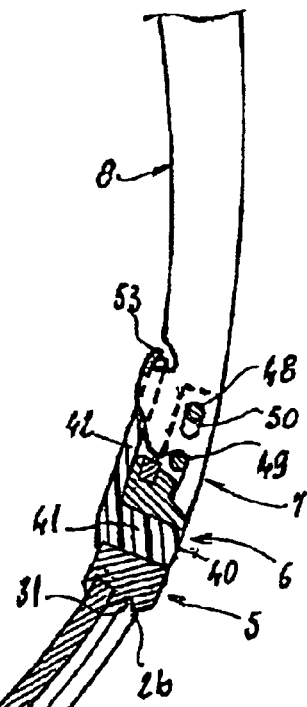
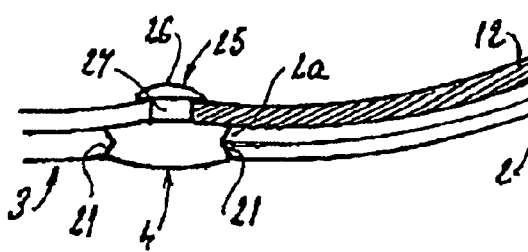

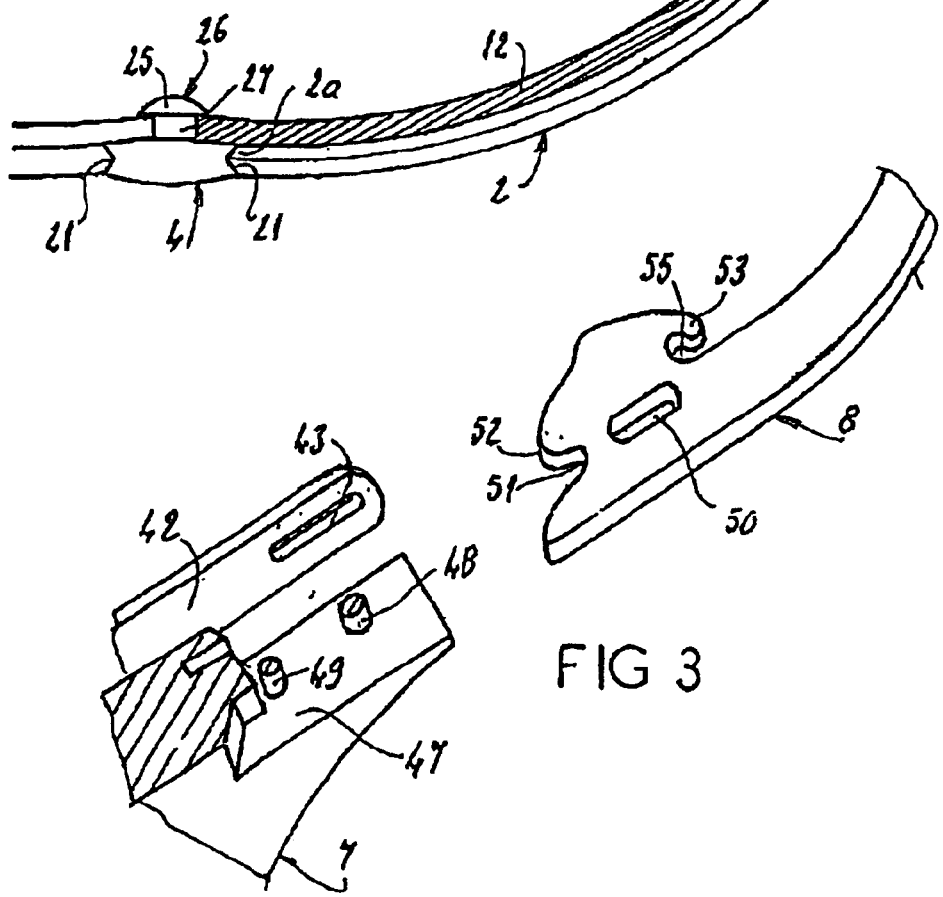

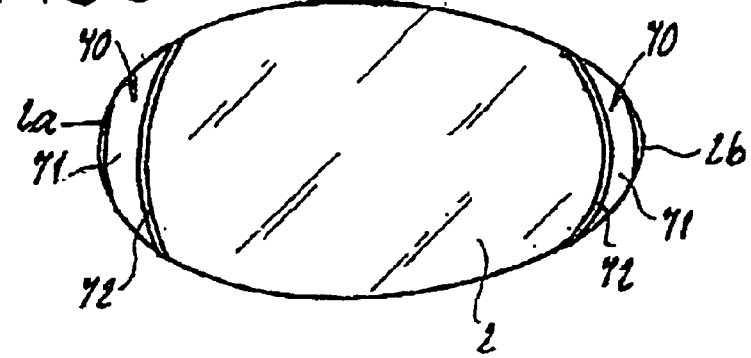
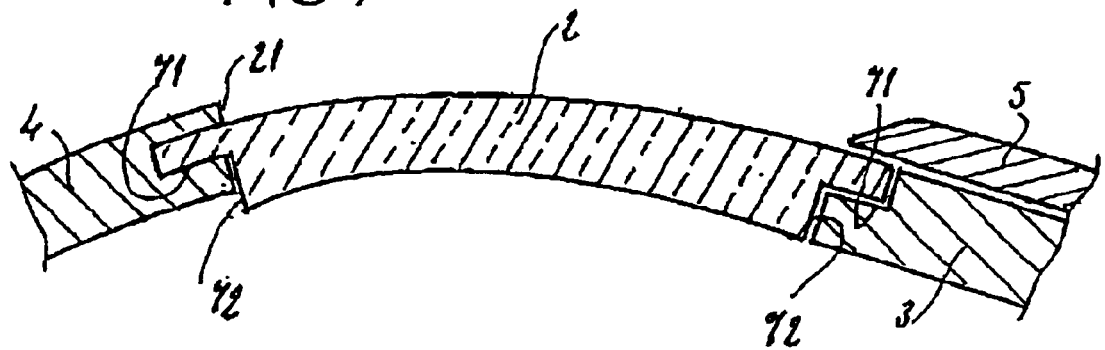

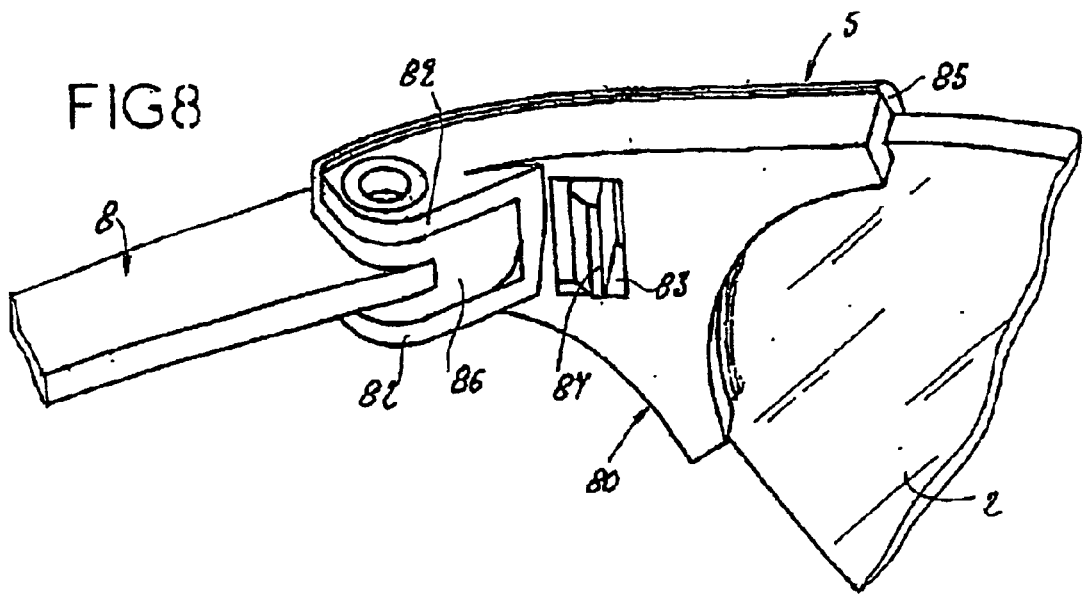
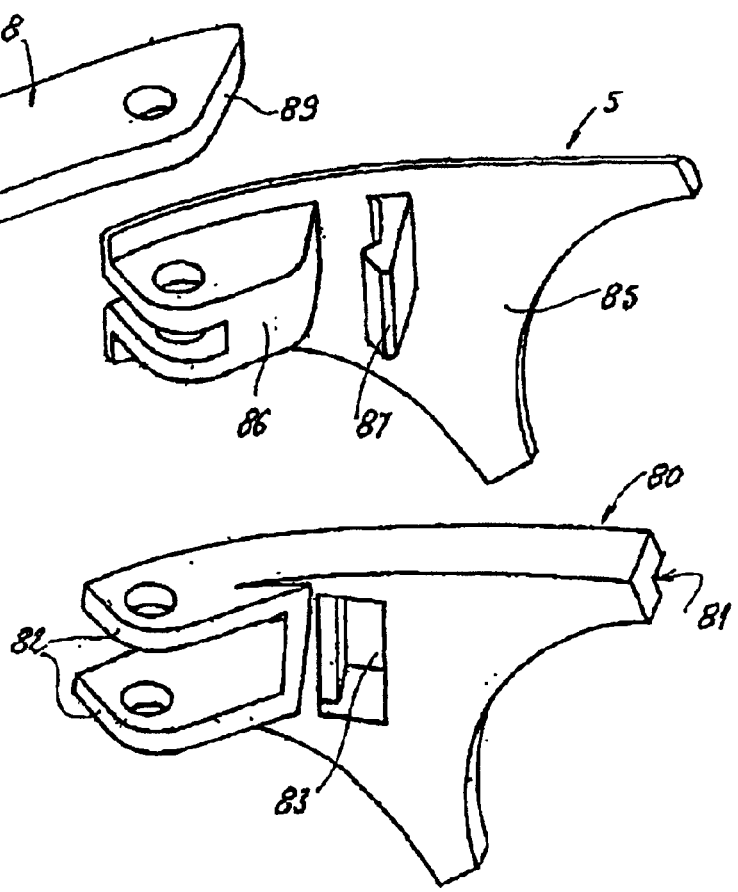

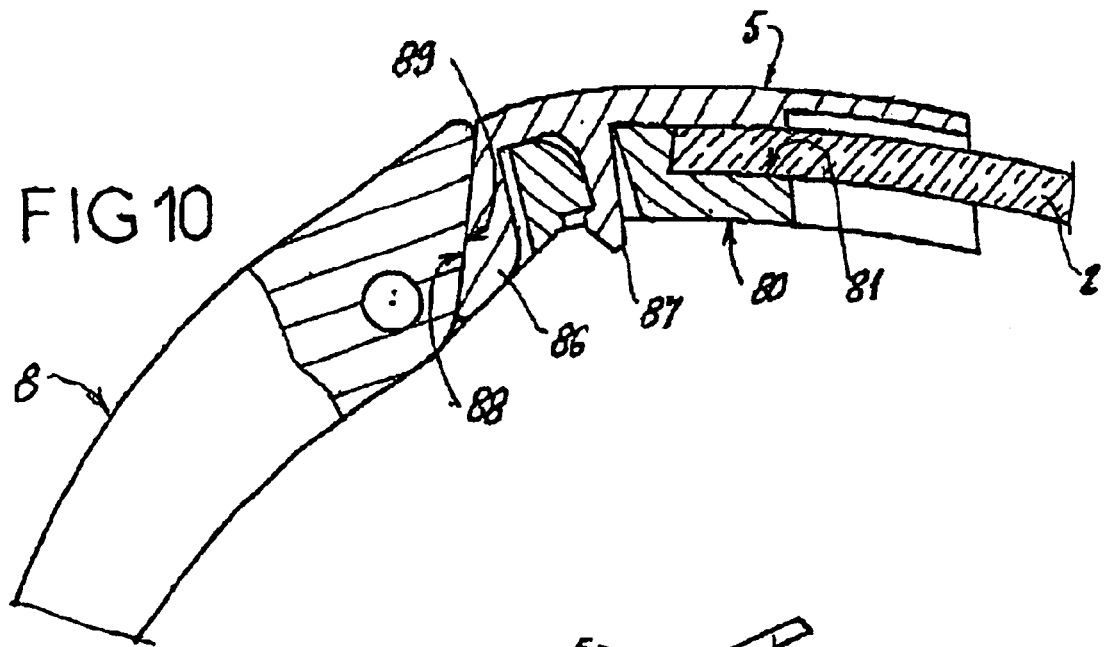
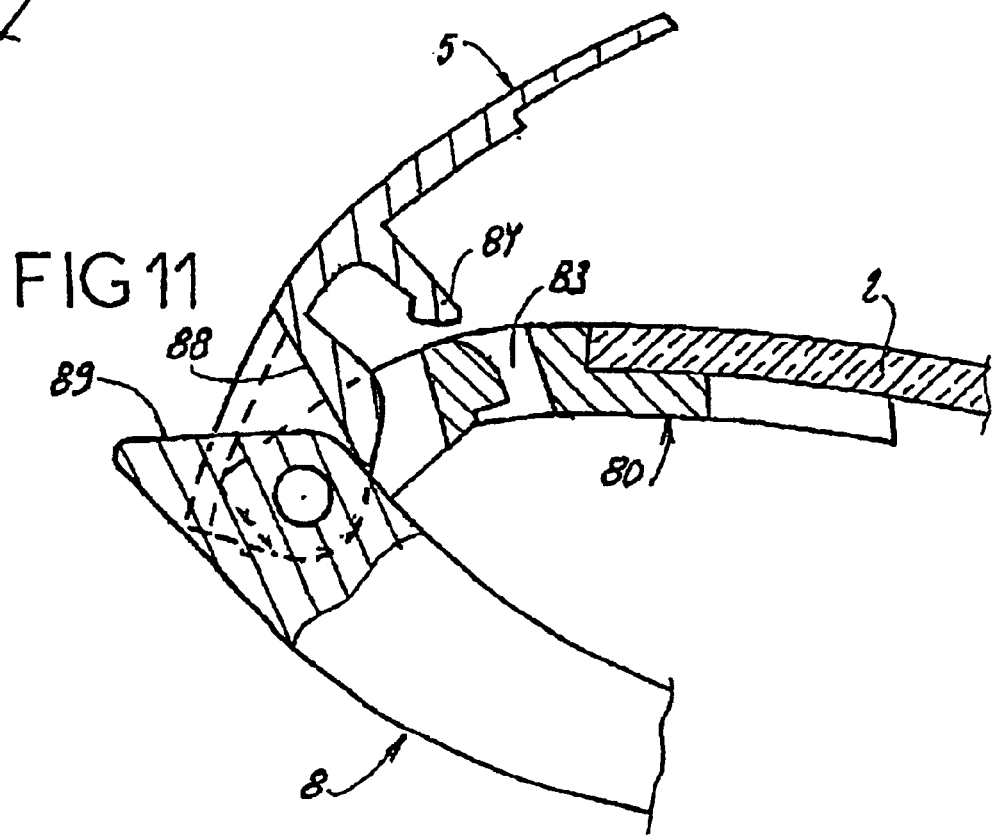

SPECTACLES WITH INTERCHANGEABLE LENSES

TECHNICAL FIELD

The present invention relates to a pair of glasses with interchangeable lenses, especially a pair of sports glasses.

BACKGROUND OF INVENTION

In general, it is useful to be able to interchange the lenses of a pair of glasses, for example to interchange transparent lenses with tinted lenses, or corrective lenses with noncorrective lenses, and vice versa. It may also be useful, when taking part in certain sports, in particular skiing, to be able to interchange the lenses of a pair of glasses according to the weather.

There are pairs of glasses allowing interchanging of this sort. However, the existing models do not always allow this interchanging to be carried out simply and easily, do not always hold the lenses perfectly securely and do not always have a simple structure which is easy to manufacture.

There are also pairs of glasses comprising sides which can be held in the extended position, and which can be returned to their folded position when they are made to leave this extended position. Likewise, existing models having this feature are not always very simple and easy to manufacture.

Furthermore, existing pairs of glasses often have sides which either do not hold the pair perfectly on the user's head, or comprise ends which are relatively irritating to the ears.

SUMMARY OF INVENTION

The present invention aims to overcome all these drawbacks.

The invention provide a frame allowing the lenses to be easily and quickly interchanged, while at the same time holding the lenses perfectly securely and while preserving a structure which is particularly simple and easy to manufacture.

The invention further provides a pair of glasses of this sort which can be used with corrective lenses.

Still further the invention provides a pair of glasses whose sides are held in the extended position and are returned to their folded position when they are made to leave this extended position, while preserving a structure of a pair of glasses which is simple and easy to manufacture.

The invention also provides a pair of glasses whose sides hold the pair perfectly on the user's head, without being irritating to the ears.

The pair of glasses in question comprises, in a manner known per se, a frame, lenses and means enabling these lenses to be interchanged.

According to the invention, the means of interchanging a lens comprise:

assembly regions made in the side edges of the lens;
 receiving regions for these assembly regions, made in the frame and having shapes which are complementary to that of said assembly regions, at least one of these receiving regions being formed at least partially by a piece which can be moved with respect to the frame, this mobility taking place between an engaged position, ensuring the lens is held in position on the frame, and a retracted position, enabling this lens to be engaged between the receiving regions, or this lens to be released from between these receiving regions, and
 at least one holding means enabling the moveable piece to be held normally in the engaged position.

A lens is thus interchanged simply and quickly by bringing said moveable piece into the retracted position, by releasing the lens present on the frame, then by engaging a replacement lens between the receiving regions, and by returning said moveable piece into the engaged position.

According to one embodiment of the invention, the said holding means consists, for each moveable piece, of a pad made of an elastically compressible material, placed between the moveable piece and the frame, or between this moveable piece and a fixed piece placed on the frame, this pad normally holding the moveable piece in the engaged position and being compressed when the moveable piece is brought into the retracted position.

The structure of the pair of glasses is thus particularly simple.

Preferably, in this case:

the frame comprises a nose piece fastened to it, the side edges of which form two receiving regions for the lenses, and side openings for mounting said moveable pieces and said pads made of an elastically compressible material; each opening has a larger-section part and a smaller-section part, the latter being oriented parallel to the direction of movement of the moveable piece;
 each moveable piece has, for it to be mounted on the frame, a mushroom-shaped stud whose head is smaller than said larger-section part, but larger than said smaller-section part, and whose body is smaller than said smaller-section part, such that this stud may be engaged in said opening through said larger-section part, then that its body may be engaged by sliding in said smaller-section part, said head then bearing against the frame and thus retaining the moveable piece on this frame;
 each pad also has a mushroom-shaped stud whose head is larger than said larger-section part and whose body substantially corresponds, in terms of size, to this larger-section part, it being possible for this stud to be forcibly engaged in the larger-section part, which causes the head of the stud to deform, until this head emerges through the opening, and returns to its original shape, thus locking the pad on the frame.

Advantageously, the frame may have, for each lens, a fixed bearing piece placed such that the pad is located between it and the moveable part, this fixed bearing piece defining a bearing surface for the pad.

This bearing surface may thus be shaped optimally for the deformation of the pad.

The pair of glasses according to said embodiment thus advantageously comprises:

at each aforementioned side opening, a second smaller-section part located on the opposite side of the first smaller-section part with respect to the larger-section part, and
 each fixed bearing piece comprises a mushroom-shaped stud whose head is smaller than said larger-section part, but larger than said second smaller-section part, and whose body is smaller than said second smaller-section part, such that this stud may again be engaged on the larger-section part, then that its body may be engaged in said second smaller-section part, said head then bearing against the frame and thus retaining this fixed bearing piece on this frame. Preferably,
 the frame comprises, in the pivot region of each side, a guiding spindle for this pivoting side and a lug forming a stop;

each side has an aperture for its engagement on the spindle, which aperture is oriented longitudinally allowing the side to slide longitudinally on this spindle, and a housing suitable for receiving said lug within itself; said sliding takes place between an engaged position of the lug in the housing, which enables the side to be held in the extended position, and a released position of the lug out of the housing, enabling the side to be rotated about the spindle, for the purpose of folding this side back; each side further comprises a catching lip made on its inner edge, behind said spindle;

the pair of glasses comprises two strips made of an elastic material which can be stretched longitudinally, each of these strips being located in a pivot region of a side; each strip is connected to the frame by one end, to the inner face of this frame, and has an opening in its other end, this opening being shaped so that the strip can be engaged on said catching lip and being positioned such that the strip is stretched when it is caught on this lip.

When the side is in the extended position, the strip extends along the inner edge of the side, and the snap-back of this strip normally holds the side engaged on the lug. When the side is released from the lug, this same snap-back causes the side to pivot into its folded position.

Advantageously, each housing is connected, on the inside of the side, to a rounded region forming a cam capable of sliding over the lug.

The passage of the side from the extended position to the position from which the folding of this side starts thus takes place by simple sliding, caused by exerting a lateral pressure on the side. It is therefore not necessary to pull longitudinally on the side so as to release the latter from the lug.

According to a preferred embodiment of the invention, in this case, said spindle for guiding a side and said lug forming a stop are made in said fixed bearing piece, and each elastic strip made of a longitudinally stretchable material forms a body with the pad forming said holding means.

The number of pieces forming the pair of glasses according to the invention is thus very small.

Each assembly region made in a side edge of a lens may have at least one bevel ensuring it is held more firmly on the frame.

Each assembly region may also have, on the inside of the lens, a recess made in its thickness, defining a side assembly wing and a shoulder, this side assembly wing and this shoulder being dimensioned so as to cooperate with complementarily shaped surfaces of the corresponding receiving region.

The corrective lens shaped in this way has a smooth outer face and assembly regions made on its inner face. It therefore has an appearance no different from a noncorrective lens with regard to its outer face, which makes it possible for the pair of glasses according to the invention to conceal the port of the corrective lenses. Furthermore, the pair of glasses may receive both noncorrective lenses and corrective lenses, which increases its possibilities for use.

The receiving zone of a lens fitted with such an assembly region having a side wing/shoulder may thus be formed by a recess made in the frame, having a shape complementary to that of the side assembly wing and the shoulder, and by said moveable piece. The latter may be sliding so as to cover said side assembly wing in the engaged position, and to be retracted beyond this side assembly wing in the retracted position. The moveable part may also be simply detachable and be assembled to the frame, for example by snap-catching, these snap-catching means forming said holding means; each moveable piece may also be mounted so that it can pivot on the frame.

In the latter case, the pivot pin of each moveable piece and the pivot pin of each corresponding side are advantageously coincident, one and the same pin being used to mount the side and the corresponding moveable piece on the frame.

The pair of glasses then has a particularly simple structure.

Preferably, in this case, each side is shaped so as to bear against the outer face of the corresponding moveable piece when this side is in the extended position. This side thus provides a firmer hold for the corresponding moveable piece in the engaged position. The aforementioned holding means, making it possible to hold each moveable piece in the engaged position when the corresponding side is not extended, may simply consist of snap-catching means.

Advantageously, each side has a straight distal shape and receives, at its free end, a bearing piece designed to bear against the mastoid bone of the skull when the pair of glasses is worn.

For it to be properly understood, the invention is again described below with reference to the appended schematic drawing showing, by way of nonlimiting examples, three possible embodiments of the pair of glasses to which it relates.

BRIEF DESCRIPTION OF THE DRAWINGS

FIG. 1 is an exploded perspective view of a first embodiment, only one of the lenses and one of the sides being shown;

FIG. 2 is a partial side view, in the mounted state, of this pair of glasses;

FIG. 3 is a detailed exploded perspective view;

FIG. 4 is a partial view in section along the line IV—IV of FIG. 2;

FIG. 5 is a view similar to FIG. 4, in another position of one of its sides;

FIG. 6 is a front view of a lens which can be used with the pair of glasses according to the second embodiment;

FIG. 7 is a view of this lens and of the frame receiving this lens, in section passing through the longitudinal mid-region of the lens;

FIG. 8 is a partial perspective view of the pair of glasses according to a third embodiment;

FIG. 9 is a view similar to FIG. 8, but exploded, and

FIGS. 10 and 11 are partial top and sectional views, in a position locking a lens and a position unlocking this lens, respectively.

DETAILED DESCRIPTION OF INVENTION

In the description below, the pieces or parts of a piece which are identical or similar from one embodiment to another are denoted by the same numerical references. Moreover, the terms "front", "rear", "inner" or "outer" are to be taken into consideration with respect to a user wearing the pair of glasses.

FIGS. 1 to 5 show a pair of glasses 1 with interchangeable lenses 2, especially a pair of sport glasses.

This pair of glasses 1 comprises, in addition to the lenses 2, a frame 3, a nasal support piece 4, two moveable pieces S, two pieces 6 made of an elastically deformable material, two bearing pieces 7, two sides 8 and two side end pieces 9.

Each lens 2 has rounded side edges 2a, 2b and, as is shown in FIGS. 4 and 5, a double bevel made in its entire periphery. The beveled faces form, at the edges 2a, 2b, regions for assembling this lens 2 to the rest of the pair of glasses 1.

The frame 3 has a nasal support region 10, through which a hole 11 is drilled, two arches 12 and two temporal regions 13, each one of which has an opening. As is shown in FIG. 1, this opening has a larger-section part 15, of circular shape, and smaller-section parts 16, 17, having elongate shapes. The part 16 located on the side of the region 10 is oriented substantially in the direction of this region 10.

The nasal support piece 4 has a lower inverted "U"-shaped edge 20, matched to a resting place on the top of a nose, and comprises two rounded side edges 21. Each of these edges 21 has a curved groove, with a "V"-shaped cross section, the curvature and cross section of which closely correspond, in the negative, to the curvature and to the cross section of the inner edges 2a of the lenses 2. These grooves thus form receiving regions for said assembly regions.

The piece 4 also comprises a mushroom-shaped stud 25, projecting from its rear face, that is to say from its face turned toward the user's face when the pair of glasses 1 is worn. The head 26 of this stud 25 has a diameter greater than that of the hole 11, and is elastically deformable, so that it can be engaged through this hole 11. The body 27 of the stud 25 has a diameter corresponding substantially to that of the hole 11, and has a length such that the head 26 protrudes slightly beyond the rear face of the frame 3 when the rear face of the piece 4 is in contact with the front face of the frame 3. This stud 25 thus makes it possible to mount the piece 4 on the frame 3 by snap-catching into the hole 11.

Each moveable piece 5 has two sides 30 giving it a "U"-shape. Together, these two sides 30 define a curved groove 31 with a "V"-shaped cross section. In the same way as for the piece 4, the curvature and the cross section of this groove 31 closely correspond, in the negative, to the curvature and to the cross section of the outer edges 2b of the lenses 2.

On the side opposite the sides 30, the piece 5 has a straight edge 32.

Furthermore, the piece 5 has a mushroom-shaped stud 33, projecting from its rear face. The head of this stud 33 has a diameter which is slightly smaller than the diameter of the part 15 but greater than the width of the part 16, while the body of this stud 33 has a diameter slightly smaller than the width of the part 16, and a length slightly greater than the thickness of the frame 3.

This stud 33 may be engaged through the part 15, and its body may be engaged inside the part 16 and be guided by sliding in the latter. Following this engagement, the head of the stud 33 retains the piece 5 on the frame 3.

Each piece 6 comprises a portion 40 forming a pad, a portion 41 forming a mounting stud and a portion 42 forming a strip. This piece 6 is made by molding from an elastic material, especially a polymer, 60 that the portion 40 can be compressed transversely and the portion 42 can be stretched longitudinally.

The portion 40 has a substantially rectangular shape.

The portion 41 is substantially cylindrical. It has a diameter corresponding substantially to that of the part 15 and a length equal to the added thicknesses of the frame 3 and of the head of the stud 33. On the side opposite the portion 40, the portion 42 forms a rim around the portion 41, suitable for bearing against the rear face of the head of the stud 33.

The portion 42 has a predetermined length and has, in its free end, an opening 43 made in a predetermined location, as will be explained hereinbelow.

Each piece 7 comprises a straight edge 45 and a stud 46 similar to the straight edge 32 and to the stud 33 of the piece 5, respectively. On the side opposite the edge 45, the piece 7 comprises a recess 47 allowing a side 8 to be mounted so that it can pivot, as can be seen more particularly in FIG. 3. At this recess 47, the piece 7 comprises a spindle 48 for guiding the pivoting of the side 8 and a lug 49 forming a stop.

Each side 8 comprises an aperture 50, a housing 51, a rounded surface 52 and a catching lip 53.

The aperture 50 is oriented longitudinally and allows the side 8 to slide longitudinally on the spindle 48.

The housing 51 is suitable for receiving the lug 49 within itself and is connected, on the inside of the side 8, to the rounded surface 52, which forms a cam capable of sliding over the lug 49.

The catching lip 53 is made beyond the aperture 50. With the side 8, it defines an insertion cavity 55, in which the portion 42 may be engaged, using the opening 43 that it has, this opening 43 being positioned such that the portion 42 is stretched when this engagement is achieved.

Each side 8 has an overall elongate shape, without curvature at its free end. The end piece 9, that it receives on this free end, forms an oval-shaped bearing piece 60, designed to bear against the mastoid bone of the skull when the pair of glasses 1 is worn.

A lens 2 can simply and quickly be interchanged by moving the corresponding piece 5 against the elastic force of the portion 40 forming a pad, by releasing the lens 2 present on the frame 3, then by engaging a replacement lens between the receiving regions of the pieces 4 and 5. The pair of glasses 1 nevertheless retains a structure which is particularly simple and easy to manufacture.

The portion 42 enables the sides to be kept in an extended position (FIG. 4), and returned to their folded position (FIG. 5) when they are made to leave this extended position, while still retaining, for the pair of glasses 1, a structure which is simple and easy to manufacture.

As for the pieces 60, they make it possible for the pair 1 to be perfectly held on the user's head, without being irritating to the ears.

FIGS. 6 and 7 show a lens 2, each assembly region 2a, 2b of which has a recess 70 made in its thickness, on the inside of the lens 2. This recess 70 defines a side assembly wing 71 and a shoulder 72 cooperating with complementarily shaped surfaces of the receiving regions.

As shown in FIG. 7, the nasal support piece 4, or the frame 3 itself, then has grooves made in its side edges 21, shaped so that the wings 71 of the lenses 2 can be closely received; at the temporal regions, the frame 3 has recesses of complementary shape to those of the wings 71 and shoulders 72, and comprises two moveable pieces 5, the latter being detachable and assembled to the frame 3 by snap-catching means (not shown).

With reference to FIGS. 8 to 11, it is apparent that the pair of glasses 1 according to the third embodiment comprises mounting regions 80 at the temporal parts of the frame, two moveable pieces 5 mounted so that they can pivot with respect to the mounting regions 80, and two sides 8 which are also mounted so that they can pivot with respect to the mounting regions 80.

The mounting regions 80 can be made directly on the frame, for example by machining or molding, or can be made on pieces fastened to the frame.

Each mounting region 80 comprises:

on its front, a rebate 81 for receiving the corresponding edge of the lens 2, two parallel walls 82 projecting rearward, and an intermediate transverse opening 83.

The two walls 82 have coaxial holes drilled in them and thus form a yoke for the pivoting reception of the moveable piece 5 and of the corresponding side 8.

Thus, as shown more particularly in FIGS. 10 and 11, the transverse opening 83 is defined, on the rear, by an outer rounded face and by an inner flat face, this flat face being connected, on the inside of the region 80, to a face oriented substantially perpendicularly to it. These two flat faces define an acute angle forming an edge for locking by snap-catching, as will become apparent below.

Each moveable piece 5 comprises a front region 85 shaped so as to cover the corresponding edge of the lens 2, a rear post 86 and a snap-catching notch 87.

The post 86 is suitable for being received by pivoting in the yoke formed by the walls 82 and has a recess in which the side 8 is intended to be received so that it can pivot. The bottom of this recess is defined by an oblique wall 88 extending in a direction going from the rear and inside of the piece 5 to the front and outside thereof. The post 86 further comprises two coaxial holes facing the holes of the walls 82 when the piece 5 is in the mounted position on the region 80.

The notch 87 projects from the inner face of the piece 5 and is shaped so as to enter the opening 83 when this piece 5 is brought into the locked position and to be locked by snap-catching behind said inner flat face.

The side 8 has an oblique front edge 89, for coming into contact with said oblique wall 88 in the completely extended position of this side 8, and a mounting/pivoting hole.

A pin is sunk into the respective holes of the region 80, the piece 5 and the side 8.

As is understood with reference to FIGS. 10 and 11, when they are extended, the sides 8 hold the pieces 5 in the locked position, the edges 89 of these sides 8 bearing against the walls 88 of the pieces 5. Perfect holding of the lenses 2 is thus ensured.

When the sides 8 are folded, the notches 87 hold the pieces 5 in the locked position. These pieces 5 may easily be unlocked, by pressure on the edges of the notches 87, so as to release the lenses 2.

Thus as is apparent from the above, the invention provides a pair of glasses with interchangeable lenses, especially a pair of sport glasses, having many advantages with respect to the similar pairs of glasses of the prior art, and overcoming the drawbacks thereof.

It goes without saying that the invention is not limited to the embodiment described above by way of example, but that on the contrary, it encompasses all the variant embodiments. Thus, each arch 12 may receive a piece 65 for receiving the upper edge of the corresponding lens 2, as shown in FIG. 2.

What is claimed is:

1. A pair of glasses with interchangeable lenses, comprising: a frame; the lenses; and means for enabling the lenses to be interchanged; wherein the means of interchanging a lens include:

assembly regions made in side edges of the lenses;

receiving regions for the assembly regions, made in the frame and having shapes which are complementary to that of said assembly regions, at least one of these receiving regions being formed at least partially by a piece which can be moved with respect to the frame, this mobility taking place between an engaged position, ensuring the lenses are held in position on the frame, and a retracted position, enabling the lenses to be engaged between the receiving regions, or this lens to be released from between the receiving regions, and at least one holding means enabling the moveable piece to be held normally in the engaged position.

2. The pair of glasses as claimed in claim 1, wherein the holding means includes, for each moveable piece, a pad made of an elastically compressible material, placed between the moveable piece and the frame, or between the moveable piece and a fixed piece placed on the frame, the pad normally holding the moveable piece in the engaged position of the receiving regions, and being compressed when the moveable piece is brought into the retracted position.

3. The pair of glasses as claimed in claim 2, wherein:

the frame comprises a nose piece fastened thereto including side edges which form two receiving regions for the lenses, and side openings for mounting said moveable pieces and said pads made of an elastically compressible material; each opening has a larger-section part and a first smaller-section part, the latter being oriented parallel to a direction of movement of the moveable piece;

each moveable piece includes a first mushroom-shaped stud for mounting the piece on the frame, having a first head smaller than said larger-section part but larger than said first smaller-section part, such that the first stud may be engaged in said opening through said larger-section part and the first body may be engaged by sliding in said first smaller-section part, said first head then bearing against the frame and thus retaining the moveable piece on the frame;

each pad includes a second mushroom-shaped stud having a second head larger than said larger-section part and a second body substantially corresponding, in terms of size, to the larger-section part, the second stud being forcibly engageable in the larger-section part, which causes the second head of the second stud to deform, until the second head emerges through the opening, and returns to an original shape, thus locking the pad on the frame.

4. The pair of glasses as claimed in claim 3, wherein the frame includes for each of the lenses, a fixed bearing piece placed such that the pad is located between the fixed bearing piece and the moveable part, this fixed bearing piece defining a bearing surface for the pad.

5. The pair of glasses as claimed in claim 4, wherein:

each side opening, comprises a second smaller-section part located on an opposite side of the first smaller-section part with respect to the larger-section part, and each fixed bearing piece comprises a third mushroom-shaped stud including a third head smaller than said larger-section part, but larger than said second smaller-section part, and a third body smaller than said second smaller-section part, such that the third stud may be engaged on the larger-section part and the third body may be engaged in said second smaller-section part, said third head then bearing against the frame and thus retaining the fixed bearing piece on the frame.

6. The pair of glasses as claimed in claim 1, wherein:

the frame comprises, in a pivot region of each side, a guiding spindle, and a lug forming a stop;

each side includes an aperture for engagement of the side on the spindle, the aperture being oriented longitudinally allowing the side to slide longitudinally on the spindle, and a housing suitable for receiving said lug; and sliding takes place between an engaged position of the lug in the housing, which enables the side to be held in an extended position, and a released position of the lug out of the housing, enabling the side to be rotated about the spindle, for the purpose of folding the side back; each side further comprises a catching lip formed on an inner edge, behind said spindle;

the pair of glasses comprises two strips made of an elastic material which can be stretched longitudinally, each of these strips being located in a pivot region of a side; each strip is connected to the frame by one end to an inner face of the frame and has an opening in another end, the opening being shaped so that the strip can be engaged on said catching lip and being positioned such that the strip is stretched when caught on the lip.

7. The pair of glasses as claimed in claim 6, wherein each housing is connected, on the inside of the side to a rounded region forming a cam capable of sliding over the lug.

8. The pair of glasses as claimed in claim 6, wherein:

said spindle for guiding a side and said lug forming a stop are formed on said fixed bearing piece, and each strip made of a longitudinally stretchable material forms a body with the pad forming said holding means.

9. The pair of glasses as claimed in claim 1, wherein each assembly region has, on an inside of the lens, a recess made in a thickness of the lens, defining a side assembly wing and a shoulder, this side assembly wing and this shoulder being dimensioned so as to cooperate with complementarily shaped surfaces of the corresponding receiving region.

10. A lens for a pair of glasses as claimed in claim 9, wherein each assembly region includes, on the inside of the lens, a recess made in a thickness of the lens, defining a side assembly wing and a shoulder, the side assembly wing and the shoulder being dimensioned so as to cooperate with complementarily shaped surfaces of the corresponding receiving region of the pair of glasses.

11. The pair of glasses as claimed in claim 1, wherein each moveable piece is mounted to pivot on the frame.

12. The pair of glasses as claimed in claim 11, wherein a pivot pin of each moveable piece and a pivot pin of each corresponding side are coincident, one and the same pin being used to mount the side and the corresponding moveable piece on the frame.

13. The pair of glasses as claimed in claim 11, wherein each side shaped so as to bear against an outer face of the corresponding moveable piece when the side in an extended position.

14. The pair of glasses as claimed in claims 1, wherein each side has a straight distal shape and receives, at a free end, a bearing piece designed to bear against a mastoid bone of a skull when the pair of glasses is worn.

* * * * *